United States Patent
Faruque et al.

(10) Patent No.: US 10,064,452 B1
(45) Date of Patent: Sep. 4, 2018

(54) SEATBELT TONGUE

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M. Jaradi, Macomb, MI (US); Ching-Hung Chuang, Northville, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 1 day.

(21) Appl. No.: 15/638,430

(22) Filed: Jun. 30, 2017

(51) Int. Cl.
*A44B 11/25* (2006.01)
*B60R 22/28* (2006.01)
*B60R 22/18* (2006.01)

(52) U.S. Cl.
CPC ...... *A44B 11/2561* (2013.01); *A44B 11/2553* (2013.01); *B60R 22/28* (2013.01); *B60R 2022/1812* (2013.01); *B60R 2022/281* (2013.01); *B60R 2022/286* (2013.01); *B60R 2022/289* (2013.01)

(58) Field of Classification Search
CPC . A44B 11/2561; A44B 11/2553; B60R 22/28; B60R 2022/1812; B60R 2022/286; B60R 2022/289
See application file for complete search history.

(56) References Cited

U.S. PATENT DOCUMENTS

| | | | |
|---|---|---|---|
| 7,996,964 B2 * | 8/2011 | Wendt | B60R 22/28 24/593.1 |
| 8,944,468 B2 * | 2/2015 | Cox | A44B 11/2561 280/801.1 |
| 2010/0117437 A1 * | 5/2010 | Hiramatsu | B60R 22/28 297/472 |
| 2010/0180409 A1 * | 7/2010 | Ito | A44B 11/2561 24/593.1 |
| 2017/0144623 A1 * | 5/2017 | Cahill | B60R 22/28 |

FOREIGN PATENT DOCUMENTS

| | | |
|---|---|---|
| CN | 104106885 B | 8/2016 |
| DE | 102012000489 A1 | 9/2012 |
| JP | 2007126012 A | 5/2007 |
| JP | 2010076558 A * | 4/2010 |
| JP | 2014061869 A | 4/2014 |
| KR | 185881 B1 | 5/1999 |

* cited by examiner

*Primary Examiner* — Faye M Fleming
(74) *Attorney, Agent, or Firm* — Frank A. MacKenzie; Bejin Bieneman PLC

(57) ABSTRACT

A seatbelt tongue includes a webbing-receiving portion, a tongue portion, and a connecting portion connecting the webbing-receiving portion and the tongue portion. The connecting portion includes a lattice structure plastically deformable relative to the webbing-receiving portion and the tongue portion.

18 Claims, 5 Drawing Sheets

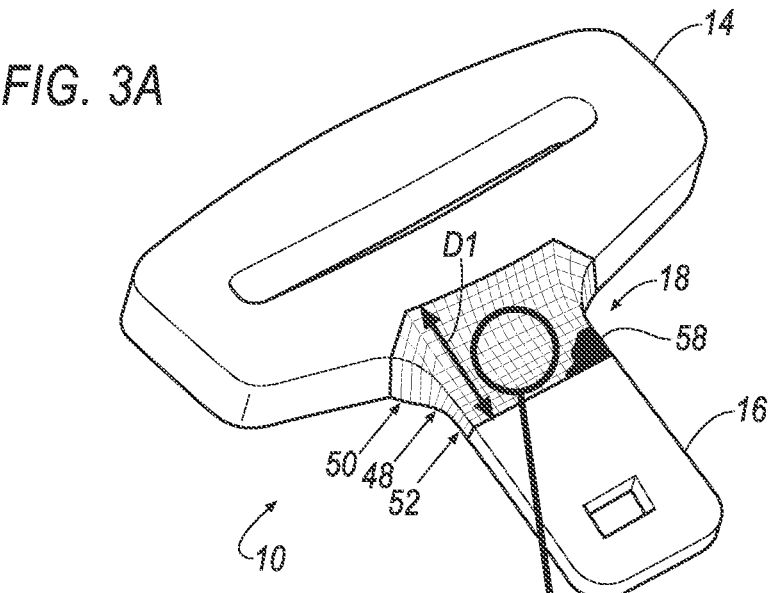
FIG. 3A
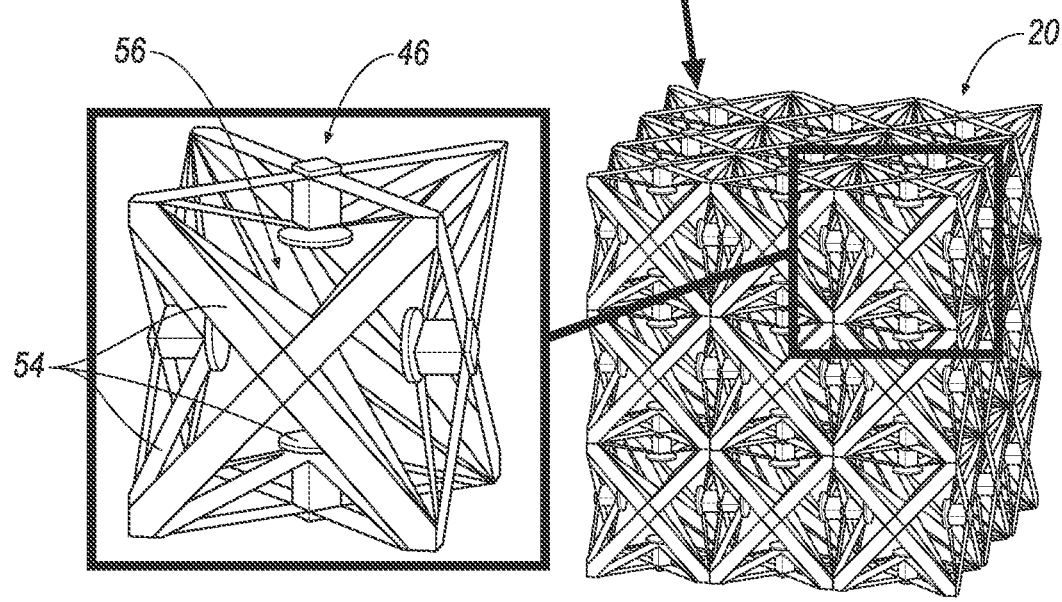
FIG. 3C
FIG. 3B

SEATBELT TONGUE

A vehicle restraint system, such as a seat seatbelt, limits a movement of a vehicle occupant during a vehicle impact. Additionally, a seat seatbelt pretensioner may limit a movement of the vehicle occupant even further to reduce and/or limit a likelihood of injury to the vehicle occupant caused by the vehicle impact. Since the seatbelt is routed across occupant chest and/or lap, the seatbelt can, during impact, apply an excessive tension to, e.g., ribs, abdomen, etc. of the vehicle occupant.

BRIEF DESCRIPTION OF THE DRAWINGS

FIG. 3A is a perspective view of the seatbelt tongue.

FIG. 3B is a magnified view of a plurality of cells of a lattice structure of the seatbelt tongue of FIG. 3A.

FIG. 3C is a magnified view of one cell of the lattice structure of FIG. 3B.

DETAILED DESCRIPTION

Figure 1:
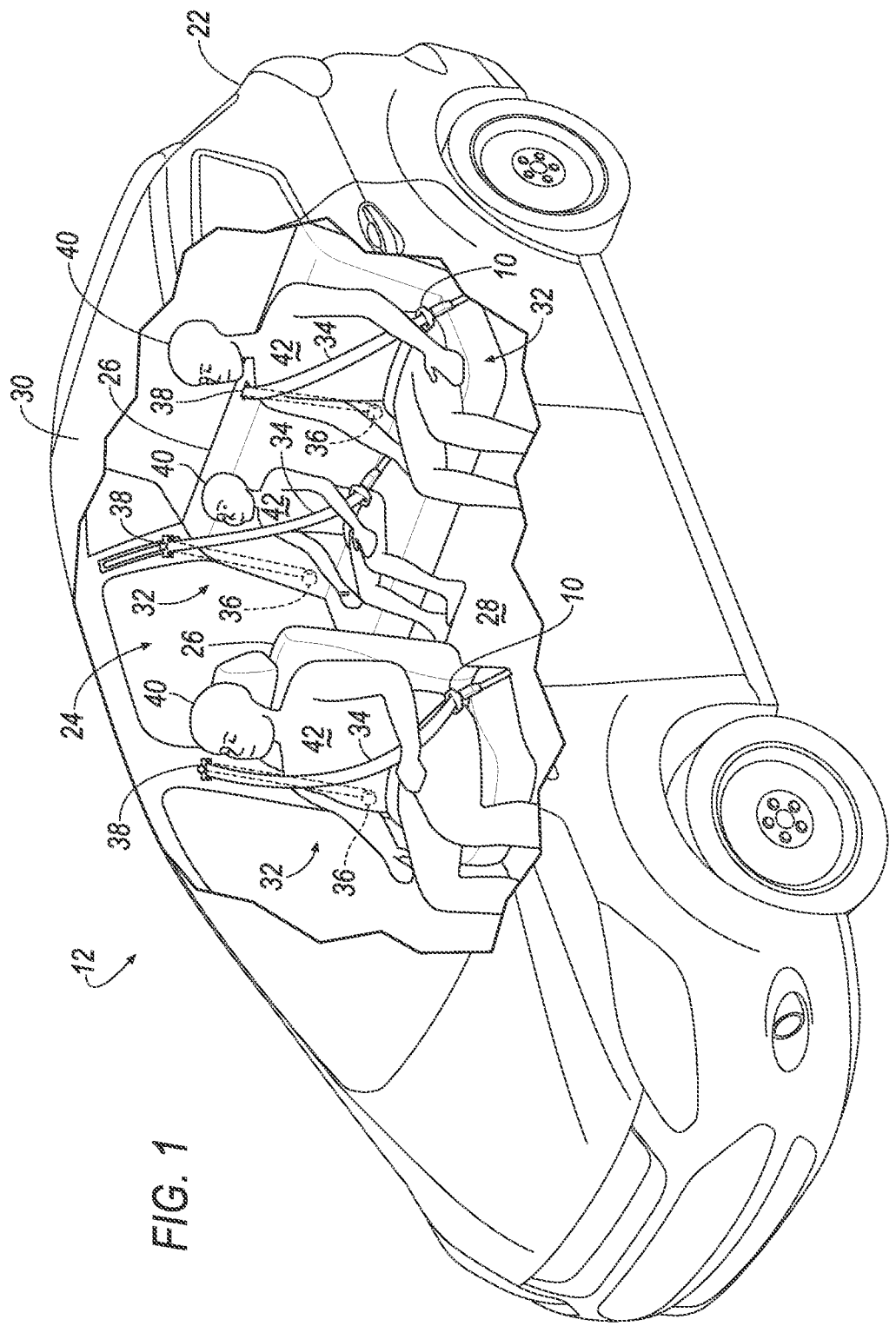
FIG. 1 is a perspective view of an example vehicle including multiple seatbelts.

A seatbelt tongue includes a webbing-receiving portion, a tongue portion, and a connecting portion connecting the webbing-receiving portion and the tongue portion. The connecting portion includes a lattice structure plastically deformable relative to the webbing-receiving portion and the tongue portion.

The tongue portion may be formed of metal. The connecting portion may be formed of metal.

The lattice structure may be 3D printed. The seatbelt tongue may be 3D printed.

The lattice structure may include a repeating pattern of cells connected to each other. Each cell includes a plurality of strips and a void between the strips. Each strip of each cell may be connected to another one of the strips of the cell and/or to one of the strips of an adjacent one of the cells.

The lattice structure may include a first lattice structure with a first strength and a second lattice structure with a second strength greater than the first strength. The second lattice structure may be between the first lattice structure and one of the web-receiving portion and the tongue portion.

The connecting portion may be covered with a second material, and the second material may include an outer surface flush with the tongue portion and the webbing-receiving portion. The second material may be a polymer.

The connecting portion may extends along a length from the web-receiving portion to the tongue portion, and the length of the connecting portion may elongate as the lattice structure plastically deforms relative to the web-receiving portion and the tongue portion.

A thickness of the connecting portion may taper from the web-receiving portion to the tongue portion.

The lattice structure may have a negative Poisson's ratio.

A seatbelt assembly includes a seatbelt retractor, a seatbelt having a webbing payable from the seatbelt retractor, and a seatbelt tongue slideably receiving the webbing and releaseably mountable to a buckle. The seatbelt tongue includes a webbing-receiving portion, a tongue portion, and a connecting portion connecting the webbing-receiving portion and the tongue portion. The connecting portion includes a lattice structure plastically deformable relative to the webbing-receiving portion and the tongue portion The tongue portion may be formed of metal. The connecting portion may be formed of metal.

With reference to the Figures, wherein like numerals indicate like parts throughout the several views, a seatbelt tongue 10 for a vehicle 12 includes a webbing-receiving portion 14, a tongue portion 16, and a connecting portion 18 connecting the webbing-receiving portion 14 and the tongue portion 16. The connecting portion 18 includes a lattice structure 20 plastically deformable relative to the webbing-receiving portion 14 and the tongue portion 16.

Although illustrated as a sedan, the vehicle 12 may include any passenger or commercial automobile such as a car, a truck, a sport utility vehicle, a crossover vehicle, a van, a minivan, a taxi, a bus, etc.

The vehicle 12 may have a body 22, e.g., a unibody construction. The body 22 may be formed of any suitable material, for example, steel, aluminum, etc. The body 22 may be sheet metal, e.g., steel. The sheet metal may be 0.7-1.5 mm thick. Alternatively, the body 22 can be of any suitable material of any suitable thickness.

With reference to FIG. 1, the body 22 includes a passenger compartment 24. The passenger compartment 24 may include multiple seats 26, a floor 28, and a roof 30. The seats 26 may be, for example, mounted to the floor 28.

Figure 2:
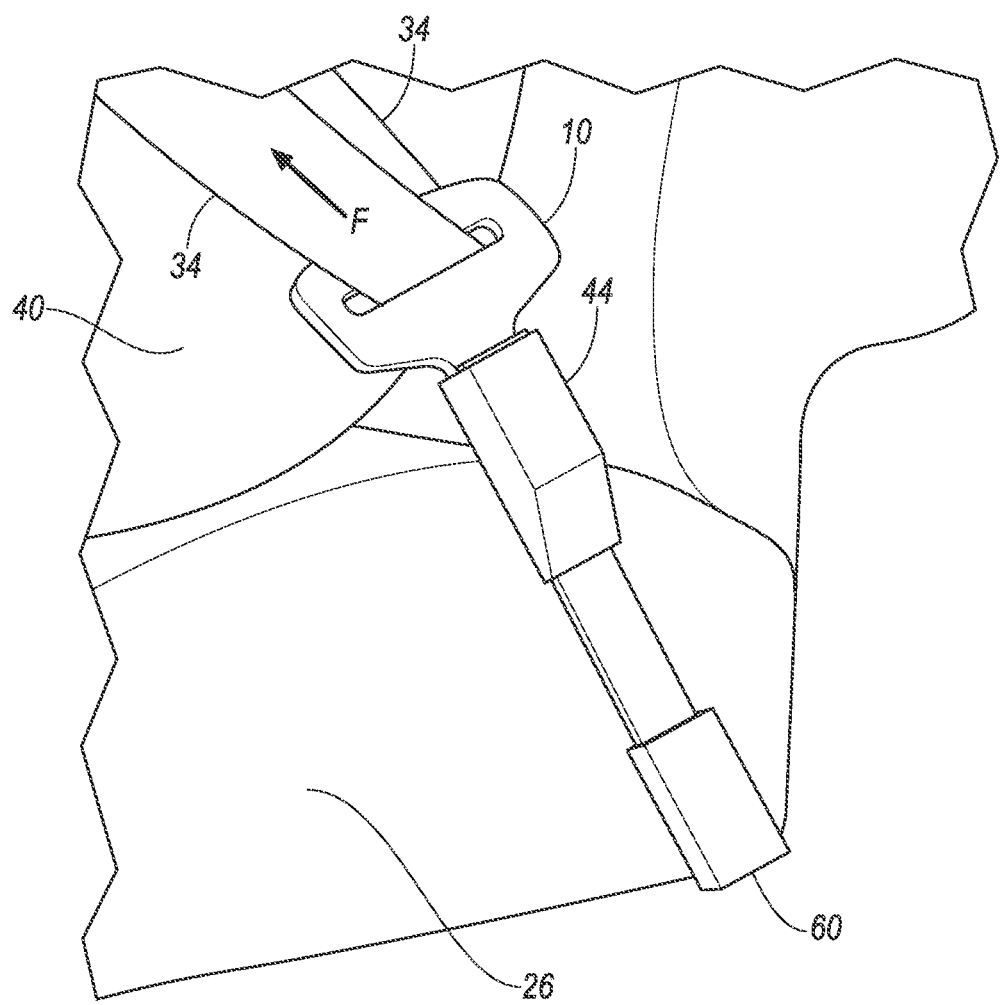
FIG. 2 is a perspective view of a portion of the vehicle including an example seatbelt and an example seatbelt tongue.

The vehicle 12 may include one or more seatbelt assemblies 32. The seatbelt assembly 32 may include a seatbelt retractor 36, a seatbelt 34 payable from the seatbelt retractor 36, and the seatbelt tongue 10. The seatbelt tongue 10 slideably receives the seatbelt 34. The seatbelt assembly 32 includes a buckle 44, and the seatbelt tongue 10 and is releaseably mountable to a buckle 44 (see FIG. 2). The buckle 44 may be mounted to the floor 28, the seat 26, etc.

The seatbelt assembly 32 may include an anchor point 38 spaced from the seatbelt retractor 36 and slideably receiving the seatbelt 34. The anchor point 38 may position the seatbelt 34 to restrain a torso 42 of an occupant 40 during a vehicle impact. The seatbelt 34 may be mounted at three points, as shown in FIG. 1, i.e., may be a three-point harness, or it may be mounted at two or four points. The anchor point 38 may, for example, include a D-ring that slideably receives the seatbelt 34. The anchor point 38 may be mounted to a pillar, or the roof 30. Alternatively the anchor point 38 may be fixed to a seatback of the seat (not shown).

During, e.g., a frontal and/or rear impact, the seatbelt assembly 32 restrains the occupant 40 at the seat 26 and/or limits a displacement of the occupant 40 relative to the seat 26 in response to a vehicle acceleration caused by the vehicle impact. As a result of inertial force, restraining the occupant 40 during a vehicle impact, the seatbelt 34 may apply force to the torso 42 of the occupant 40. For example, the seatbelt 34 may apply chest compression and or abdominal compression during the vehicle impact.

The seatbelt assembly 32 may include a pretensioner 60. Upon a sensed vehicle impact, the pretensioner may be actuated to retract the seatbelt 34 to reduce slack in the seatbelt 34. The pretensioner, for example, may be connected to the buckle 44. The pretensioner 60 may be of any suitable type, such as a ball-in-tube pretensioner, in which an explosive charge propels a ball or balls over a cogwheel connected to the cable; a piston pretensioner, in which an explosive charge drives a piston attached to the cable; a mechanical pretensioner, in which a compressed spring attached to the cable is released; or any other suitable type.

As set forth above, the lattice structure 20 of the connecting portion 18 is plastically deformable relative to the webbing-receiving portion 14 and the tongue portion 16. During this plastic deformation, the length of the seatbelt tongue 10 increases to relieve excess applied to the torso of the occupant, e.g., to reduce chest compression and/or abdominal compression, caused by inertia of the occupant during the vehicle impact and/or tightening of the seatbelt 34 by the pretensioner 60.

Plastic deformation, in the context of present disclosure, is a deformation of a solid material undergoing irreversible changes of its shape in response to applied forces. For example, as discussed below regarding FIGS. 4 and 5, the connecting portion 14 may plastically deform when a tensile force F caused during the vehicle impact exceeds a threshold. When the tensile force F exceeds the threshold, the seatbelt tongue 10, e.g., the connecting portion 14, plastically deforms. The threshold at which the tensile force F plastically deforms the lattice structure 20, may be designed to based on the size, shape, material, dimensions of cells 46 of the lattice structure 20, shape of the cells 46, the volume fraction of the lattice structure 20, etc. The operational characteristics of the lattice structure 20 may be designed based on the threshold at which the tensile force F plastically deforms the lattice structure, an estimated weight of the occupant 40, a length of the seatbelt 34, deceleration forces of the vehicle 12, pretensioner operation, etc. The seatbelt tongue 10 in the deformed positon, e.g., after the vehicle impact, may be replaced with a new seatbelt tongue 10.

As shown in FIGS. 3A-3D, the seatbelt tongue 10 includes the webbing-receiving portion 14, the tongue portion 16, and the connecting portion 18 disposed between the webbing-receiving portion 14 and the tongue portion 16. The webbing-receiving portion 14, the tongue portion 16, and the connecting portion 18 may, for example, be formed of metal, e.g., steel. The webbing-receiving portion 14, the tongue portion 16, and the connecting portion 18 may be formed of the same type of metal, or different types of metal. The webbing-receiving portion 14 and the tongue portion 16 may be solid, e.g., solid metal. As set forth above, the connecting portion 18 is formed of a lattice structure 20, as described further below. As also described further below, the lattice structure 20, for example, may be formed by 3D printing.

Figure 3D:
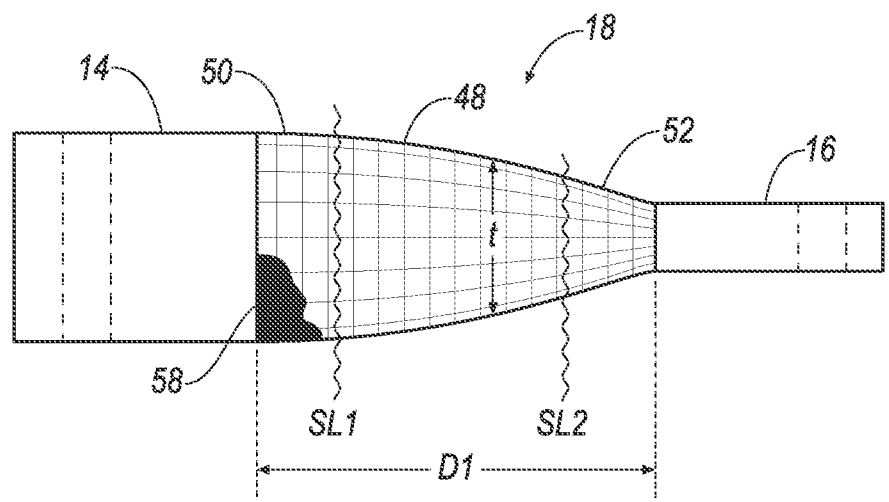
FIG. 3D is a side view of the seatbelt tongue of FIG. 3A.

The connecting portion 18 may have an original length D1. The original length D1, in the present context, refers to a length of the connecting portion 18 prior to a deformation, e.g., stretching due to the tensile force F. In one example, as shown in FIGS. 3A and 3D, a thickness t of the connecting portion 18 may taper from the webbing-receiving portion 14 to the tongue portion 16. In other words, a first thickness of the connecting portion 18 at the webbing-receiving portion 14 is greater than a second thickness of the connecting portion 18 at the tongue portion 16. As another example, the connecting portion 18 may have a constant thickness t.

Figure 4:
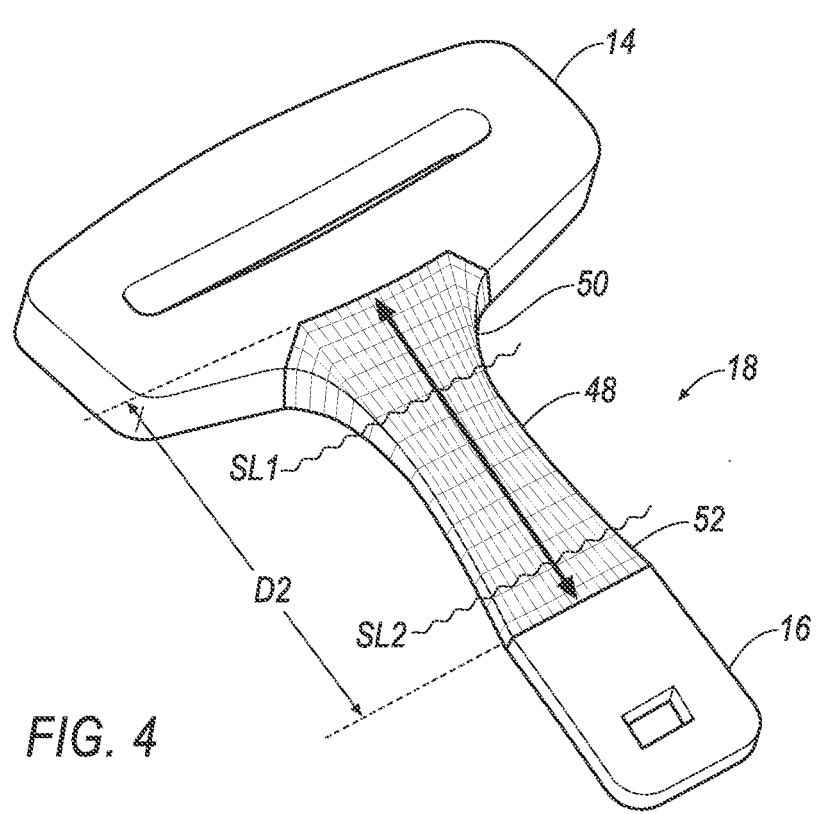
FIG. 4 is a perspective view of the seatbelt tongue after being plastically deformed during a vehicle impact.

As shown in FIG. 4, the connecting portion 18 may extend along a length from the webbing-receiving portion 14 to the tongue portion 16, and the length of the connecting portion 18 may elongate as the connecting portion 18 plastically deforms relative to the webbing-receiving portion 14 and the tongue portion 16. In other words, the connecting portion 18 may stretch from the original length D1, as shown in FIG. 3A, to an extended length D2 after plastic deformation, as shown in FIG. 4. For example, the original length D1 may be, for example, 2 cm, and in response to the tensile force F exceeding the threshold, e.g., caused by the vehicle impact, the connecting portion 18 the extended length D2 may be, for example 5 cm.

Figure 5:
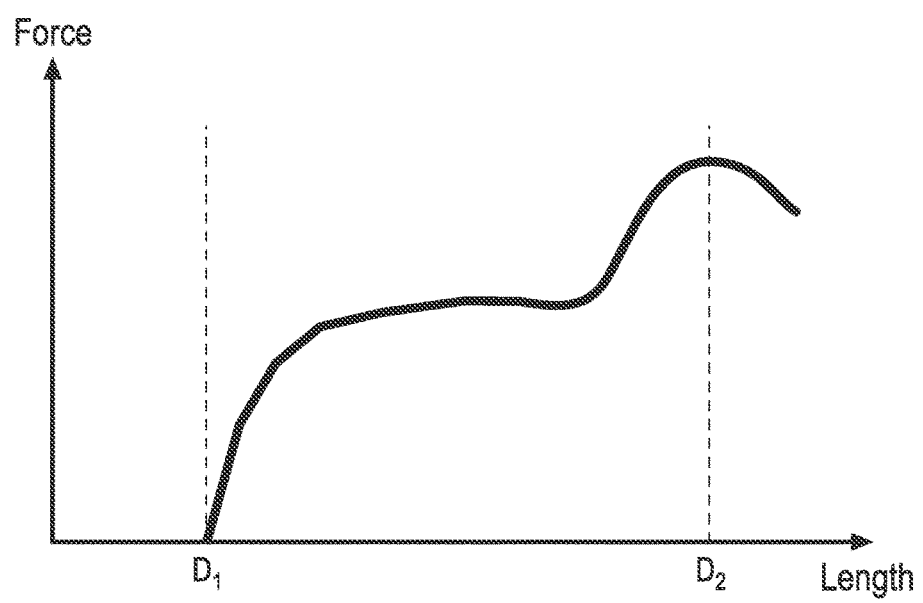
FIG. 5 is a graph depicting a tensile force applied to the connecting portion and a resulted change of a length of the connecting portion.

FIG. 5 illustrates a graph including the tensile force F and the length of the connecting portion 18. The connecting portion 18 may have the original length D1. In response to the application of the tensile force F that exceeds the threshold, the connecting portion 18 deforms to the extended length D2. In the example shown in FIG. 5, the lattice structure 20 has a negative Poisson's ratio. In this case, the length of the connecting portion 18 increases as the lattice structure 20 plastically deforms. As the length of the connecting portion 18 increases, the required force for plastic deformation dips before again rising to as the connecting portion stretches to the extended length D2, due to the negative Poisson's ratio of the lattice structure 20.

The lattice structure 20 may be a cellular structure that includes multiple interconnected cells 46 (see FIG. 3C), i.e., the lattice structure 20 may include a repeating pattern of cells 46 connected to each other. Each cell may be, for example, 1-2 mm in all directions. In such an embodiment, the lattice structure 20 may be monolithic, i.e., the cells 46 are connected to each other as a one-piece unit. The cells 46 may be integrally formed with each other, i.e., formed together simultaneously as a single continuous unit, e.g., by 3D printing, as discussed below.

The cells 46 may have any suitable geometric shapes, e.g., rectangular, hexagonal, pyramid, pentagonal, etc. In one example, the cells 46 may have similar dimensions and/or shape. For example, as shown in FIG. 3B, the cells 46 may be rectangular and have similar dimensions. Alternatively, some of the cells 46 may have dimensions and/or shapes different than other cells 46.

The cells 46 may each include strips 54 connected to each other and/or connected to strips 54 of adjacent cells. The strips 54 may define one of more voids 56 within the cell 46. When the lattice structure 20 is subjected to a tensile force F exceeding the threshold, the strips 54 deform by bending and/or stretching such that the lattice structure 20 elongates, as described above. The plastic deformation of the lattice structure 20 may be designed based on the thickness and shape of the strips 54, and the ratio of material of the strips 54 to the voids 56. The ratio of strips 54 to voids 56 is the volume fraction of the cells. The volume fraction may be based on dimensions of each cell 46, thickness of material pieces used to produce each cell 46, etc.

The lattice structure 20 may have a negative Poisson's ratio (NPR). In other words, the lattice structure 20 expands in a direction transverse to a direction of applied tension. To put it another way, the material becomes wider when stretched. Since the lattice structure 20 has a negative Poisson's ratio, the lattice structure 20 unfolds when tension is applied in a certain direction, for example a bow-tie honeycomb cellular structure. The lattice structure 20 may be designed to unfold when tension is applied regardless of direction, for example a reentrant unit cell structure. Unfolding of the structure absorbs energy, e.g., generated by an occupant and applied to a seat belt during a vehicle collision. Structures having a negative Poisson's ratio may be referred to as auxetic materials.

The lattice structure may include a first lattice structure with a first strength and a second lattice structure with a second strength greater than the first strength. In addition, the lattice structure may include a third lattice structure with a third strength that may be the same as one of the first and second strengths, or different that both of the first and second strengths. Specifically, with reference to FIG. 3D, the connecting portion 18 may include multiple portions 48, 50, 52, and the portions may have different properties. For example, the connecting portion 18 may have a middle portion 48 including the first lattice structure with the first strength, a second portion 50 including the second lattice structure with the second strength, and a third portion 52 including the third lattice structure with the third strength.

In one example, the second portion 50 is disposed between the webbing-receiving portion 14 and the middle portion 48, and the third portion 52 is disposed between the middle portion 48 and the tongue portion 16. In one example, each of the second and third strengths may be greater than the first strength. Thus, in response to the vehicle impact, the middle portion 48 may relatively elongate more than the second and/or third portions 50, 52. Specifically, the difference in the first, second, and third strengths of the first, second, and third lattice structures of the middle, second, and third portions 48, 50, 52, respectively, may be due to differences in lattice pattern; material, size and shape of the strips 54; ratio of strips 54 to voids 56 (i.e., volume fraction); etc.

As shown in FIG. 4, the portions 48, 50, 52 may be separated at separation lines SL1 and SL2. The separation lines SL1, SL2 represent a location where at least a property, e.g., the volume fraction, of the lattice structure 20 changes. Alternatively, the lattice structure 20 may have gradual change of properties between the portions 48, 50, 52 and lack the separation lines SL1, SL2. In other words, the connecting portion 18 may lack a step-wise change of properties between the portions 48, 50, 52. As another example, the lattice structure 20 of the connecting portion 18 may be homogenous, i.e., has the same dimension, shape, and/or volume fraction across the length of the connecting portion 18.

Various production techniques may be used to produce the lattice structure 20. For example, the lattice structure 20 may be 3D printed. For example, the lattice structure 20 can be 3D printed using Selective Laser Melting (SLM) techniques. Selective laser melting is a particular rapid prototyping, e.g., 3D printing, Additive Manufacturing (AM) technique, etc., designed to use a high power-density laser to melt and fuse metallic powders together. Additionally, the SLM process can fully melt the metal material into a solid 3D-dimensional.

For example, the seatbelt tongue 10 may be 3D printed. For example, the webbing-receiver portion 14 and the tongue portion 16 may be 3D printed as solid pieces, whereas the connecting portion 18 may be 3D printed including the lattice structure 20. For example, a 3D printing device can be configured to manufacture (i.e., print) the seatbelt tongue 10 including printing of the webbing-receiving portion 14, the connecting portion 18, and the tongue portion 16. Alternatively, the webbing-receiving portion 14, the connecting portion 18, and/or the tongue portion 16 can be manufactured separately and then attached to one another, e.g., via laser welding.

As set forth above, the connecting portion 18 may be formed of metal. Additionally or alternatively, the tongue portion 16 and/or the webbing-receiving portion 14 may be formed of metal. For example, the 3D printing device operating based on the SLM process may print the seatbelt tongue 10 using a metal powder.

The connecting portion 18 may be covered with a second material. The second material, for example, may be a polymer, e.g., a nylon, acrylonitrile butadiene styrene (ABS), vinyl, etc. The second material may include an outer surface 58 that is flush with the tongue portion 16 and the webbing-receiving portion 14 (see FIGS. 3A and 3D). In other words, the lattice structure 20 may be recessed relative to the webbing-receiving portion 14 and the tongue portion 16, and the second material may fill in that recess. The second material is shown cut-away in FIGS. 3A and 3D, and is not shown in FIG. 4 to illustrate the lattice structure 20 below the second material. The recess defined by the webbing-receiving portion 14 and the tongue portion 16 and filled by the second material is imperceptible in FIGS. 3A and 3D due to the dimensions of FIGS. 3A and 3D. The second material has decorative advantages because the seatbelt tongue 10 may have a uniform appearance, i.e., the connecting portion 18, the webbing-receiving portion 14, and the tongue portion 16 may look as one integrated piece rather than a multi-section component. In one example, when the seatbelt tongue 10 deforms (elongates), the surface 58 of the second material may fracture.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt tongue comprising:
  a webbing-receiving portion;
  a tongue portion; and
  a connecting portion connecting the webbing-receiving portion and the tongue portion, wherein the connecting portion includes a lattice structure plastically deformable relative to the webbing-receiving portion and the tongue portion, and wherein the lattice structure includes a repeating pattern of cells connected to each other.

2. The seatbelt tongue of claim 1, wherein the tongue portion is formed of metal.

3. The seatbelt tongue of claim 2, wherein the connecting portion is formed of metal.

4. The seatbelt tongue of claim 1, wherein the lattice structure is 3D printed.

5. The seatbelt tongue of claim 1, wherein the seatbelt tongue is 3D printed.

6. The seatbelt tongue of claim 1, wherein each cell includes a plurality of strips and a void between the strips.

7. The seatbelt tongue of claim 6, wherein each strip of each cell is connected to another one of the strips of the cell and/or to one of the strips of an adjacent one of the cells.

8. The seatbelt tongue of claim 1, wherein the lattice structure includes a first lattice structure with a first strength and a second lattice structure with a second strength greater than the first strength.

9. The seatbelt tongue of claim 8, wherein the second lattice structure is between the first lattice structure and one of the webbing-receiving portion and the tongue portion.

10. The seatbelt tongue of claim 1, wherein the connecting portion is covered with a second material, and the second material includes an outer surface flush with the tongue portion and the webbing-receiving portion.

11. The seatbelt tongue of claim 10, wherein the second material is a polymer.

12. The seatbelt tongue of claim 1, wherein the connecting portion extends along a length from the webbing-receiving portion to the tongue portion, and the length of the connecting portion elongates as the lattice structure plastically deforms relative to the webbing-receiving portion and the tongue portion.

13. The seatbelt tongue of claim 1, wherein a thickness of the connecting portion tapers from the webbing-receiving portion to the tongue portion.

14. The seatbelt tongue of claim 1, wherein the lattice structure has a negative Poisson's ratio.

15. A seatbelt assembly comprising:
  a seatbelt retractor;
  a seatbelt having a webbing payable from the seatbelt retractor; and
  a seatbelt tongue slideably receiving the webbing and releaseably mountable to a buckle;
  the seatbelt tongue including a webbing-receiving portion, a tongue portion, and a connecting portion connecting the webbing-receiving portion and the tongue portion, wherein the connecting portion includes a lattice structure plastically deformable relative to the webbing-receiving portion and the tongue portion, and wherein the lattice structure includes a repeating pattern of cells connected to each other.

16. The seatbelt assembly of claim 15, wherein the tongue portion is formed of metal.

17. The seatbelt assembly of claim 15, wherein the connecting portion is formed of metal.

18. The seatbelt assembly of claim 15, wherein the lattice structure is 3D printed.

\* \* \* \* \*